United States Patent [19]
Thorp

[11] Patent Number: 5,979,837
[45] Date of Patent: Nov. 9, 1999

[54] MOBILE OVERHEAD POWER/ COMMUNICATION DISTRIBUTION SYSTEM

[75] Inventor: Clarkson S. Thorp, Wayland, Mich.

[73] Assignee: Haworth, Inc., Holland, Mich.

[21] Appl. No.: 09/000,245

[22] PCT Filed: Jun. 5, 1997

[86] PCT No.: PCT/US97/10567

§ 371 Date: Jan. 8, 1998

§ 102(e) Date: Jan. 8, 1998

[87] PCT Pub. No.: WO97/46795

PCT Pub. Date: Dec. 11, 1997

Related U.S. Application Data

[60] Provisional application No. 60/019,422, Jun. 7, 1996.

[51] Int. Cl.[6] .................................................... F16L 3/00
[52] U.S. Cl. .............................. 248/49; 248/61; 174/5 R; 174/136
[58] Field of Search ................................. 248/61, 62, 53, 248/317, 188.7; 174/135, 146, 41, 40 R, 5 R, 136, 160; 254/387

[56] References Cited

U.S. PATENT DOCUMENTS

| | | | |
|---|---|---|---|
| 989,212 | 4/1911 | Nostran | 174/41 |
| 1,945,488 | 1/1934 | Lavarack et al. | 174/155 |
| 2,918,243 | 12/1959 | Johnson et al. | 248/188.7 |
| 3,200,187 | 8/1965 | McMullin | 174/136 |
| 4,856,867 | 8/1989 | Gaylin | 350/96.23 |
| 5,789,701 | 8/1998 | Wettengel et al. | 174/41 |

*Primary Examiner*—Leslie A. Braun
*Assistant Examiner*—Gwendolyn Baxter
*Attorney, Agent, or Firm*—Flynn, Thiel, Boutell & Tanis, P.C.

[57] ABSTRACT

A mobile overhead cable distribution system for an office or the like, comprising a plurality of horizontally elongate cable supporting elements connected horizontally in series and supporting thereon horizontally extending power and communication cables. A plurality of mobile and freestanding post assemblies are rollingly supported on a floor and projecting upwardly for supportive engagement with the cable supporting members to maintain the cable supporting members in upwardly spaced relation above the floor. Each serially-connected pair of cable supporting members has adjacent end connecting parts which are horizontally swingably supported on one of the upright posts adjacent an upper end thereof.

15 Claims, 4 Drawing Sheets

MOBILE OVERHEAD POWER/COMMUNICATION DISTRIBUTION SYSTEM

This application claims the benefit of provision application Ser. No. 60/019,422 filed Jun. 7, 1996.

FIELD OF THE INVENTION

This invention relates to an arrangement for supporting and distributing cables within an office-type environment and, more specifically, relates to a mobile overhead power/communication cable distribution arrangement.

BACKGROUND OF THE INVENTION

Power and telecommunication cables are conventionally distributed to work stations through walls or space-divider panels, although in some offices the cables are fed from overhead drop ceilings downwardly through power poles, or are fed along an arrangement of linking desks or tables. However, offices are more commonly utilizing collections of free-standing furniture for defining work stations, and are also providing a greater degree of openness both at and surrounding the work stations. These more open areas or work stations, and the consequent elimination or minimization of space-dividing panels and the like, increase the difficulty of distributing power and communication cables to the various work stations.

The present invention relates to a mobile cable distribution system which permits the cables to be supported within elongate overhead support members which themselves are supported on mobile upright posts to facilitate the distributing of power and communication cables to work stations which are defined generally below the overhead cable support distributing members.

In the overhead distribution arrangement of this invention, a plurality of elongate overhead cable support elements are provided each preferably having an upwardly opening channel into which cables can be deposited. The ends of adjacent cable supporting members are preferably pivotally supported on an upper end of a common upright post assembly, the latter having a wheeled base supported on the floor. A plurality of such elongate cable supporting members are connected in series to permit cables to be extended therealong, with each such member having upright posts provided in supporting engagement with the opposite ends thereof, with each series-adjacent pair of members having a common shared upright post. The connection of the ends of the cable supporting members to the posts enables the members to horizontally pivot about the post about vertical axis so that series-adjacent cable supporting members can be disposed in a variety of positions which includes a wide range of angled relationships including a longitudinally aligned relationship. Cables can be selectively fed out of the members and thence downwardly along the post for access at selected work stations. The cables can also be connected to suitable overhead outlets, such as electrical receptacles or telecommunication jacks, provided in the underside of the cable supporting members.

Other objects and purposes of the invention will be apparent to persons familiar with structures of this general type upon reading the following specification and inspecting the accompanying drawings.

Figure 3:
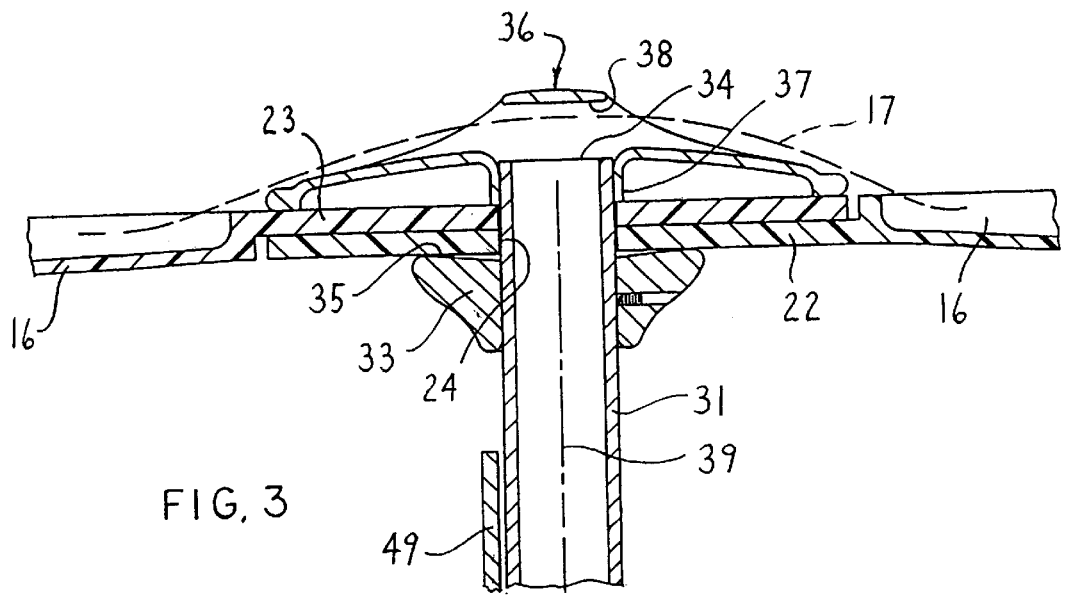
FIG. 3 is an enlarged fragmentary sectional view illustrating the connection of two adjacent cable distributing members to the upper end of an upright mobile support post.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Figure 1:
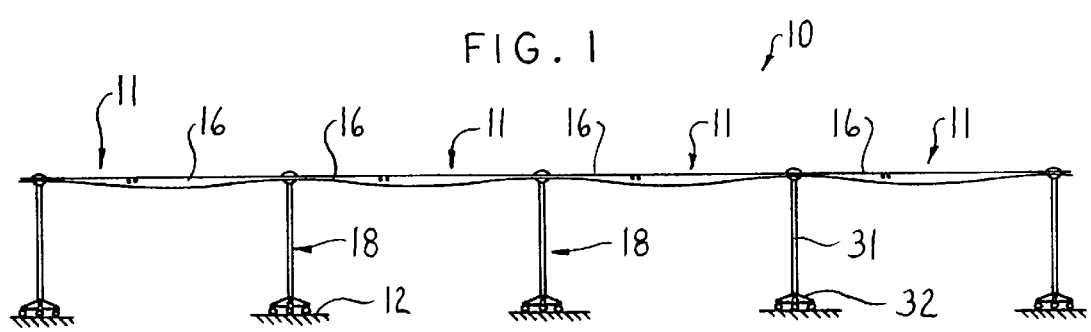
FIG. 1 is a diagrammatic elevational view illustrating a mobile overhead cable distribution system according to the present invention, the system as illustrated being defined by four generally aligned sections.

FIG. 1 illustrates therein a mobile overhead cable distribution system 10 according to the present invention. This system includes a plurality of horizontally elongate sections 11 which are serially connected together, with the individual sections also being horizontally angularly movable with respect to one another to define a desired configuration. The overall system 10 is disposed so as to be rollingly supported on a floor 12, with the system being disposed upwardly above the floor to permit cabling to extend in overhead relation relative to work stations defined on the floor.

Figure 2:
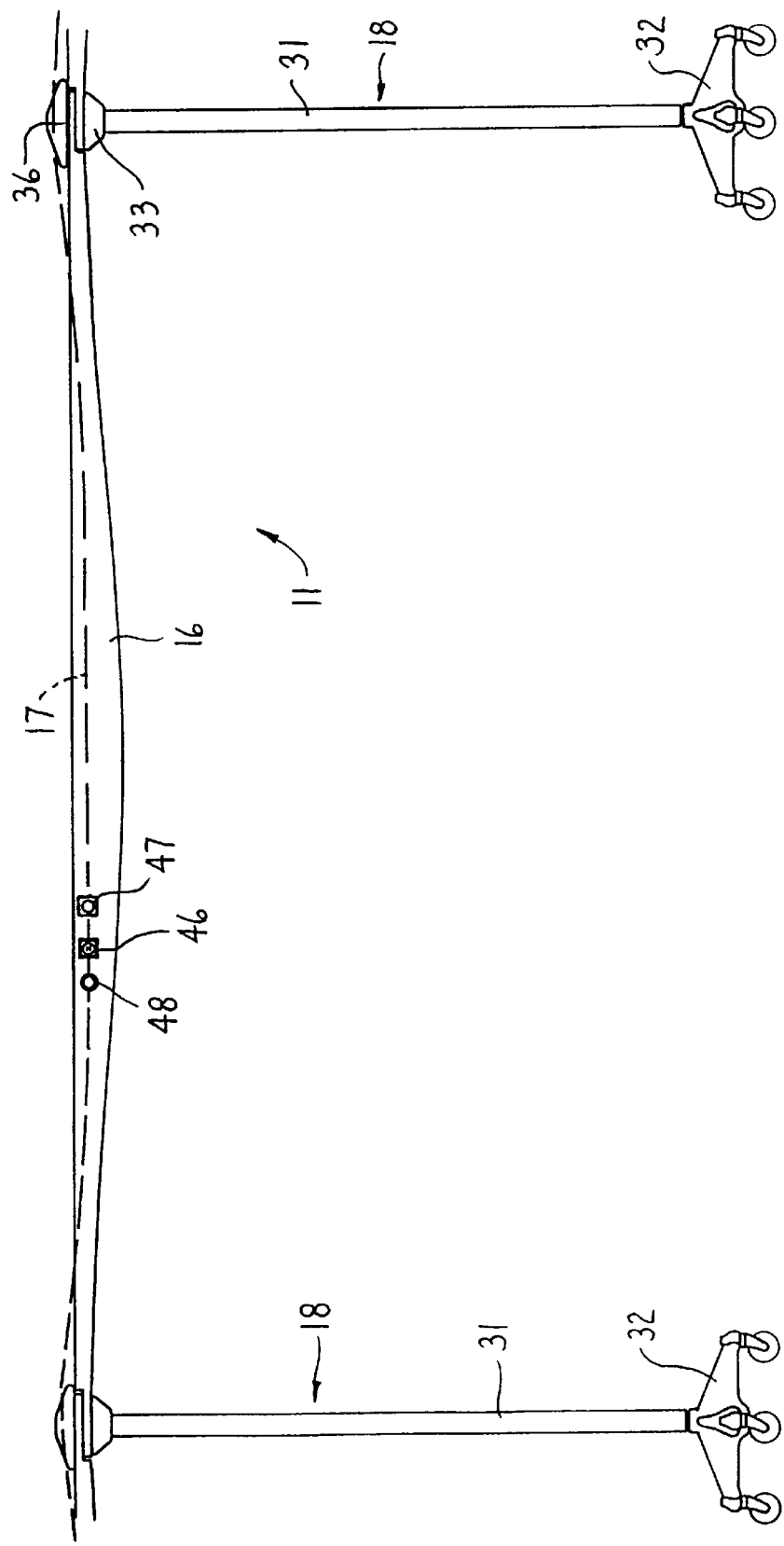
FIG. 2 is an enlarged side elevational view illustrating one of the cable distribution sections shown in FIG. 1.
Figures 4, 5:
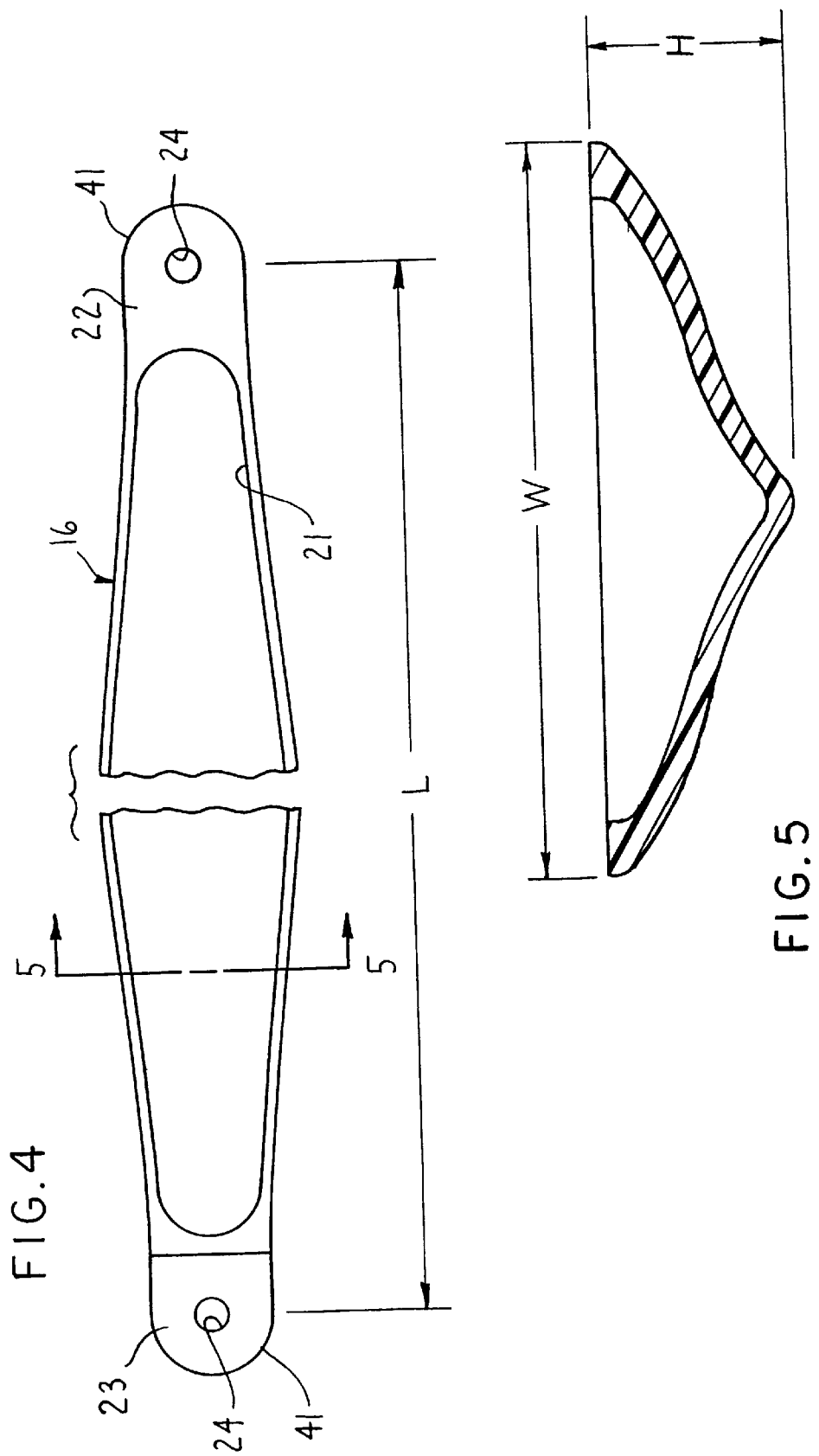
FIG. 4 is a diagrammatic top view of the horizontally elongate cable support member.
FIG. 5 is an enlarged cross-sectional view taken generally along line 5—5 in FIG. 4.

As illustrated in FIG. 2, each section 11 of the overhead distribution system includes a horizontally elongate cable support member 16 which supports therein power and/or communication cabling as diagrammatically indicated by dotted line 17. This horizontally elongate cable support member 16 is supported in upwardly spaced relation from the floor by a pair of mobile upright post assemblies 18 which supportingly engage opposite ends of the cable support member 16. The cable support member 16, in the illustrated embodiment and as shown by FIGS. 2, 4 and 5, defines therein an elongate channel 21 which opens upwardly and extends generally along the length of the member 16. Opposite longitudinally-spaced ends of the cable support member 16 are provided with mounting parts 22 and 23 thereon, the latter each having a generally cylindrical opening 24 extending vertically therethrough.

The cable support member 16 is preferably of minimal height, as represented by the height H in FIG. 5, which height is significantly less than 12 inches and is typically less than eight inches. The cable support member 16 also has a maximum horizontal transverse dimension or width W which is generally greater than the height H. Further, the overall length L (FIG. 4) of the support member 16 is significantly greater than the width W, and in fact length L will typically be at least about 8 to 10 times greater than the width W. In an exemplary embodiment, the length L will preferably be in the range of about 12 feet.

Considering the mobile upright post assembly 18, same includes a generally vertically elongate upright post 31 which is typically a cylindrical tube, and a lower end of post 31 is rigidly supported on a wheeled base 32, the latter typically possessing at least three angularly related legs each having a caster which is disposed for supportive and rolling engagement with the floor.

The upper end of upright post 31 mounts thereon an annular support collar 33 which is disposed adjacent but, as illustrated in FIG. 3, is fixedly secured to the post so as to be positioned downwardly a small axial extent from the upper free end 34 thereof. The collar 33 defines thereon a generally upwardly facing support surface 35. This support surface supportingly engages thereon the end mounting part 22 provided on the end of one cable support member 16, whereupon the support post 31 projects upwardly through the central opening 24 thereof. The end mounting part 23 of the next serially-adjacent support member 16 is in turn supportingly engaged on top of the end part 22 with the post 31 again projecting upwardly through the central opening of the end part 23. When so disposed, the upper end of the post 31 projects upwardly above the vertically superimposed end parts 22 and 23 by a small vertical extent.

Each post assembly includes a top cap 36 having a central hub part 37 which opens downwardly and accommodates therein the upwardly projecting part of the post 31. The hub part 37 projects axially downwardly so as to effectively abut against the upper surface of the end connector part 23. The top cap 36 also has one or more generally horizontally oriented passages or openings 38 extending therethrough. The opening 38 is used to permit passage therethrough of the cables 17 as they extend between serially-adjacent support members 16.

The end connector parts 22 and 23, as illustrated in FIG. 4, have generally semicylindrical or semicircular outer end surfaces 41 which, in conjunction with the flat and generally parallel upper and lower surfaces of these end mounting parts, provides for rotational support of each supporting member 16 relative to the support post 31 substantially about the upright longitudinal axis 39 thereof. This enables the two serially-adjacent supporting members 16, which members are connected through and supported by a common post 31 as illustrated in FIG. 3, to be relatively horizontally pivotally displaced about the axis 39 so that the adjacent serially-connected members 16 can either be disposed in a longitudinally aligned relationship, or they can be relatively angularly displaced into an angled relationship, such as a right-angle relationship.

Figure 6:
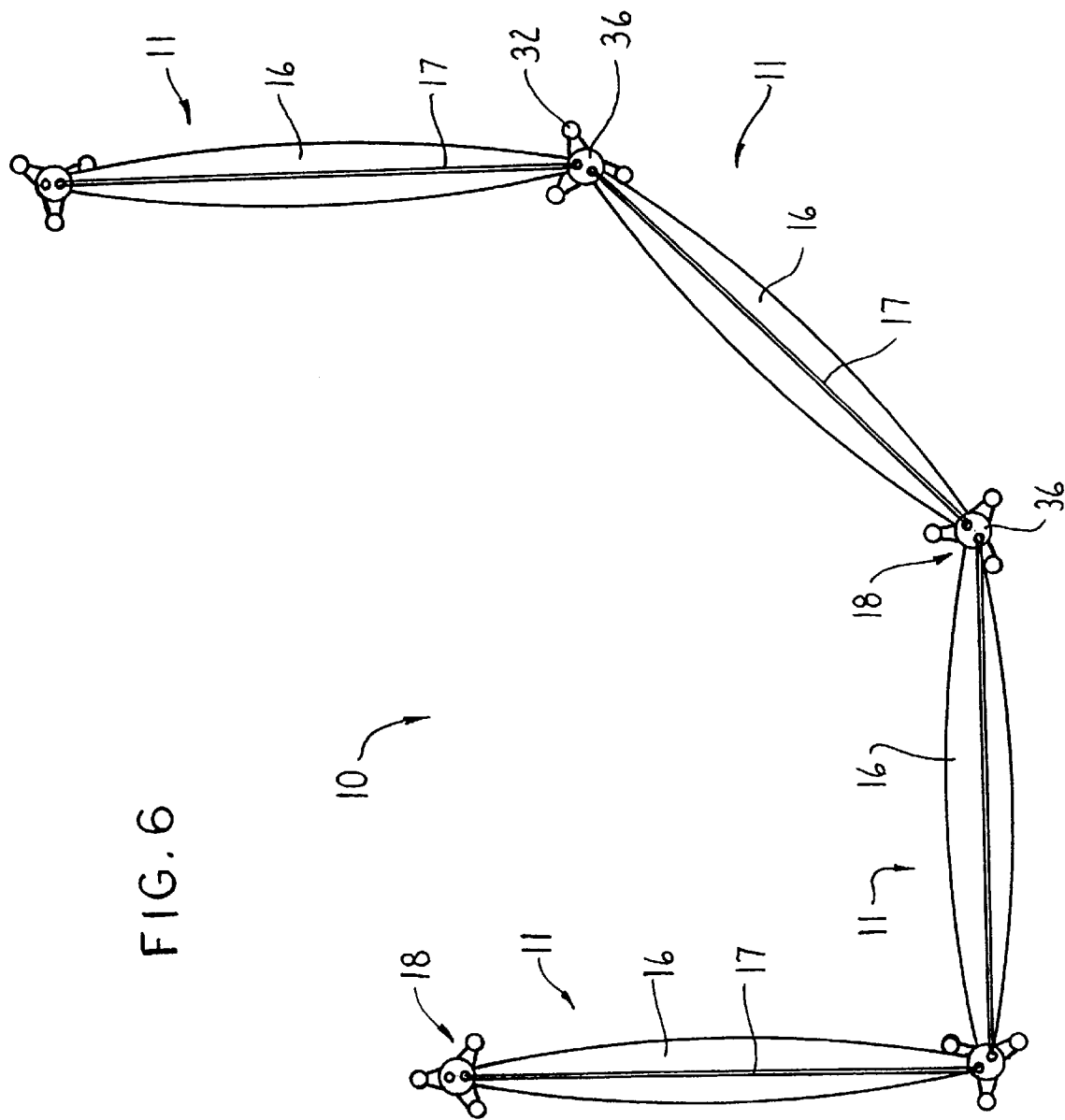
FIG. 6 is a top plan view which diagrammatically illustrates the mobile distribution system as employing four serially-connected sections, and particularly illustrating the flexibility with respect to the configuration which may be assumed by the system.

The ability of the individual sections 11 of the system 10 to be horizontally angularly moved is diagrammatically depicted in FIG. 6 which illustrates the degree of freedom and flexibility with which the overall system 10 can be oriented so as to permit distribution of cables in an overhead fashion to a wide variety of locations which are positioned thereunder.

In addition, the overhead cable supporting members 16 can themselves be provided with outlets or various devices mounted therein. For example, as illustrated in FIG. 2, the member 16 can be provided with a conventional three-prong electrical receptacle 46 mounted substantially within and flush with the sidewall of the member 16. In similar fashion, the sidewall of the member 16 can also have a telecommunication jack 47 provided thereon. The electrical receptacle and communication jack will be suitably connected to appropriate wires or cables which are provided interiorly of the member 16. The wall of the member 16 can also have a switchable light 48 mounted therein, similar to an overhead light as provided in airplanes, which light will be suitably connected to the cabling within the support member 16 and can be suitably oriented to provide directed lighting for specified areas disposed generally under and in relatively close proximity to the supporting member 16.

The post 31 can also be selectively provided with various types of attachment structures thereon so as to facilitate the feeding of cables downwardly therealong, as well as the attachment of other auxiliary office-type equipment to the post. FIG. 3 merely diagrammatically illustrates the post 31 being provided with an attachment channel or strip 49 fixed to and projecting vertically along the outside of the post, which channel will permit removable brackets, clips and the like to be attached thereto so that other objects can be secured to the post.

The mobile overhead cable distribution system 10 of this invention thus permits the floor 12 to be substantially free of cables, and hence eliminates or at least greatly minimizes floor obstructions due to the presence of cables and the like running therealong. This in turn greatly facilitates the use, placement and mobility of work stations which may be positioned on the floor, with such work stations in many cases themselves being wheeled so as to have substantial mobility. When used in conjunction with mobile work stations, the mobile overhead cable distribution system 10 of this invention can be readily reconfigured as the work stations are moved above.

In the illustrated embodiment, the cable support members 16 are preferably molded of plastic or fiberglass, and in particular the generally shallow V-shaped cross-sectional configuration thereof, which V-shaped configuration is of deepest profile at the middle and then progressively decreases towards the free ends, enables the cable supporting members 16 to be molded from a wide variety of colorful materials which, in conjunction with the actual configuration of the members 16 themselves, enable the mobile overhead arrangement to impart a colorful and decorative appearance to the work station-defining region.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. A mobile overhead cable distribution system comprising: a plurality of horizontally elongate cable supporting members connected horizontally to one another in series and supporting thereon horizontally extending cabling, and a plurality of freestanding upright post assemblies supported on a floor and projecting upwardly for supportive engagement with the cable supporting members so as to maintain said cable supporting members in upwardly spaced relation above the floor, each serially-connected pair of cable supporting members having adjacent end connecting parts which are adjacent to and supported on an upper end of one of said upright post assemblies for horizontal swinging movement relative thereto.

2. The cable distribution system according to claim 1 wherein each of said cable supporting members includes a shallow elongate channel for confining horizontally extending cabling therein.

3. The cable distribution system according to claim 2 wherein each of said cable supporting members includes an intermediate portion in which said channel is defined and a pair of said end connecting parts projecting generally horizontally outwardly from respective opposite ends of said intermediate portion thereof, each of said end connecting parts being disposed in overlapping relation with an adjacent one of said end connecting parts of a horizontally adjacent one of said cable supporting members.

4. A mobile overhead cable distribution system comprising:

a plurality of horizontally elongate cable supporting members connected horizontally in series and configured to support thereon at least one horizontally extending cable;

a plurality of mobile and freestanding upright post assemblies rollingly supported on a floor and projecting upwardly for supportive engagement with said cable supporting members so as to maintain said cable supporting members in upwardly spaced relation above the floor, each serially connected pair of said cable supporting members having first and second adjacent end connecting parts which are rotatably supported on one of said upright post assemblies adjacent an upper end thereof such that said cable supporting members are horizontally rotable relative to said one of said upright post assemblies about a vertically elongated axis thereof.

5. The cable distribution system according to claim 4, wherein said second connecting part is disposed below and in cooperatively supporting rotatable engagement with said first connecting part, and said one upright post assembly includes a collar removably secured to said one upright post assembly adjacent said upper end thereof, said collar being in supportive engagement with said second connecting part and allowing relative rotation thereon.

6. The cable distribution system according to claim 5, wherein said one upright post assembly includes a vertically elongate post and a wheeled base attached to a lower end of said post, said base including a plurality of angularly related legs projecting horizontally outwardly away from said post, each of said legs having a caster attached thereto adjacent an outer end thereof, said wheeled base being disposed to allow supportively stable and rolling engagement with the floor.

7. The cable distribution system according to claim 6, wherein said one upright post assembly has a top cap attached to said upper end thereof, said top cap including a hub part defining an opening in which said post upper end is engaged, said hub part having a lower end which abuts said first connecting part, said top cap having at least one horizontal passage for allowing the cable to pass therethrough.

8. The cable distribution system according to claim 4, wherein each of said cable supporting members includes a horizontally elongate intermediate portion which extends between and rigidly joins to said first and second connecting parts, said intermediate portion having a substantially shallow v-shaped cross section to accommodate the cable therein.

9. The cable distribution system according to claim 4, wherein said one upright post assembly includes at least one attachment strip connected thereto for attachment of a plurality of removable brackets.

10. The cable distribution system according to claim 4, wherein one of said cable supporting members has at least one telecommunication jack provided therein.

11. The cable distribution system according to claim 4, wherein one of said cable supporting members has at least one electrical receptacle provided therein for connection to a source of electric power.

12. The cable distribution system according to claim 4, wherein one of said cable supporting members has a least one light connected to a source of electric power for providing illumination.

13. A mobile overhead cable distribution system comprising:

a plurality of horizontally elongate cable supporting members connected horizontally in series for supporting thereon horizontally extending cables, each of said supporting members including a horizontally elongate intermediate portion which defines an upwardly opening channel extending therealong for confining cables thereon, each of said supporting members having a pair of generally flat plate-like end connecting parts disposed on and projecting horizontally outwardly from opposite ends of said intermediate portion thereof, each said end connecting part having an aperture extending vertically therethrough;

a plurality of mobile and freestanding upright post assemblies rollingly supported on a floor and projecting upwardly for supportive engagement with said cable supporting members so as to maintain said cable supporting members in upwardly spaced relation above the floor, each of said cable supporting members extending horizontally between and being supported by a part of said post assemblies, and each horizontally adjacent pair of said cable supporting members being serially connected by an overlapping adjacent pair of said end connecting parts which are rotatably supported on one of said upright post assemblies adjacent an upper end thereof, said one upright post assembly extending upwardly through said aperture of each said end connecting part such that said cable supporting members are horizontally rotatable about a vertically elongated axis of said one upright post assembly.

14. The cable distribution system according to claim 13, wherein one of said pair of overlapping end connecting parts has an upper surface that is in supportive rotatable contact with a lower surface of the other of said pair of overlapping end connecting parts, and said one upright post assembly includes a collar secured to said one upright upper end of said post assembly, said collar being in supportive rotatable engagement with a lower surface of said one end connecting part.

15. The cable distribution system according to claim 13, wherein the pair of end connecting parts provided at opposite ends of each of said cable supporting members includes a first said end connecting part which is disposed at one end of each of said cable supporting members and is vertically offset downwardly relative to a second said end connecting part which is provided at the other end of each of said cable supporting members.

* * * * *